(12) United States Patent
Saleh et al.

(10) Patent No.: US 11,674,380 B2
(45) Date of Patent: Jun. 13, 2023

(54) SMART RETRIEVABLE SERVICE PACKERS FOR PRESSURE TESTING OPERATIONS

(71) Applicant: Saudi Arabian Oil Company, Dhahran (SA)

(72) Inventors: Rami F. Saleh, Dhahran (SA); Peter Ido Egbe, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/410,148

(22) Filed: Aug. 24, 2021

(65) Prior Publication Data

US 2023/0068446 A1 Mar. 2, 2023

(51) Int. Cl.
*E21B 47/10* (2012.01)
*E21B 47/06* (2012.01)
*E21B 23/06* (2006.01)
*G06K 7/10* (2006.01)

(52) U.S. Cl.
CPC .............. *E21B 47/06* (2013.01); *E21B 23/06* (2013.01); *E21B 47/10* (2013.01); *G06K 7/10366* (2013.01)

(58) Field of Classification Search
CPC .......... E21B 47/06; E21B 23/06; E21B 47/10; G06K 7/10366
See application file for complete search history.

(56) References Cited

U.S. PATENT DOCUMENTS

| | | | | |
|---|---|---|---|---|
| 6,098,727 A | * | 8/2000 | Ringgenberg | E21B 17/028 166/242.6 |
| 6,384,738 B1 | * | 5/2002 | Carstensen | E21B 47/14 340/854.3 |
| 6,865,934 B2 | * | 3/2005 | Schultz | G01V 9/02 73/152.36 |
| 7,063,146 B2 | * | 6/2006 | Schultz | E21B 47/13 166/66 |
| 7,508,734 B2 | * | 3/2009 | Fink | G01V 11/002 367/43 |
| 7,854,268 B2 | | 12/2010 | Lehr et al. | |
| 9,234,412 B2 | * | 1/2016 | Getzlaf | E21B 47/06 |
| 9,617,829 B2 | * | 4/2017 | Dale | E21B 43/14 |
| 10,227,845 B2 | * | 3/2019 | Getzlaf | E21B 34/12 |
| 10,344,561 B2 | * | 7/2019 | Getzlaf | E21B 43/25 |
| 10,941,649 B2 | * | 3/2021 | Egbe | E21B 47/13 |
| 2004/0059506 A1 | * | 3/2004 | Schultz | E21B 47/10 702/2 |
| 2004/0200613 A1 | * | 10/2004 | Fripp | E21B 47/16 166/177.6 |

(Continued)

FOREIGN PATENT DOCUMENTS

EA 015030 12/2009

*Primary Examiner* — Steven A MacDonald
(74) *Attorney, Agent, or Firm* — Fish & Richardson P.C.

(57) ABSTRACT

Systems and methods include a method for using a smart retrievable service packer for pressure testing operations. A service packer is installed to a depth in a well. The service packer includes one or more radio frequency identification devices (RFIDs) positioned above and below a packer element of the service packer. A determination is made, by analyzing information received from the one or more RFIDs, that a pressure leak has occurred across the service packer. The pressure leak is reported to a surface receiver system at a surface of the well.

17 Claims, 2 Drawing Sheets

(56) References Cited

U.S. PATENT DOCUMENTS

| | | | | |
|---|---|---|---|---|
| 2005/0087339 A1* | 4/2005 | Schultz | ............... | E21B 47/13 |
| | | | | 166/244.1 |
| 2008/0316049 A1* | 12/2008 | Verret | ............... | E21B 47/10 |
| | | | | 340/854.6 |
| 2009/0266544 A1* | 10/2009 | Redlinger | ............ | E21B 29/005 |
| | | | | 166/298 |
| 2009/0294124 A1* | 12/2009 | Patel | ............... | E21B 47/09 |
| | | | | 166/255.2 |
| 2013/0068451 A1* | 3/2013 | Getzlaf | ............... | E21B 33/134 |
| | | | | 166/305.1 |
| 2013/0180726 A1* | 7/2013 | Ross | ............... | E21B 47/13 |
| | | | | 166/336 |
| 2013/0248174 A1* | 9/2013 | Dale | ............... | E21B 47/04 |
| | | | | 166/65.1 |
| 2015/0176392 A1* | 6/2015 | Corre | ............... | E21B 47/005 |
| | | | | 166/250.01 |
| 2016/0003003 A1* | 1/2016 | Getzlaf | ............... | E21B 43/14 |
| | | | | 166/305.1 |
| 2016/0010429 A1* | 1/2016 | Getzlaf | ............... | E21B 47/06 |
| | | | | 166/373 |
| 2019/0316441 A1* | 10/2019 | Getzlaf | ............... | E21B 43/12 |
| 2019/0323343 A1* | 10/2019 | Egbe | ............... | E21B 33/124 |
| 2020/0240265 A1* | 7/2020 | Machocki | ............ | E21B 49/081 |
| 2022/0275705 A1* | 9/2022 | Egbe | ............... | E21B 47/13 |

* cited by examiner

SMART RETRIEVABLE SERVICE PACKERS FOR PRESSURE TESTING OPERATIONS

TECHNICAL FIELD

The present disclosure applies to the use of service packers in wells, such as oil and gas wells.

BACKGROUND

In an oil or gas well, a service packer is typically run-in-hole (RIH) to depth. The service packer is set in place for different well objectives such as general service, squeeze cementing, testing and treating, and cased-hole production testing. To achieve these objectives, the service packer may typically isolate the cased annulus from above, and a positive or negative test can be applied as required. However, there are times when a leak occurs in the system. In some cases, the leak may occur at a depth along the cased hole. In other cases, the leak can exist across the service packer itself. In conventional operations, the location of a potential leak point may be uncertain.

SUMMARY

The present disclosure describes techniques that can be used for a smart retrievable service packer for pressure testing operations, such as to identify when a leak exists across the service packer. In some implementations, a computer-implemented method includes the following. A service packer is installed to a depth in a well. The service packer includes one or more radio frequency identification devices (RFIDs) positioned above and below a packer element of the service packer. A determination is made, by analyzing information received from the one or more RFIDs, that a pressure leak has occurred across the service packer. The pressure leak is reported to a surface receiver system at a surface of the well.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method, the instructions stored on the non-transitory, computer-readable medium.

The subject matter described in this specification can be implemented in particular implementations, so as to realize one or more of the following advantages. A potential leak that exists across the service packer can be identified, eliminating uncertainties regarding failed pressure test operations. By eliminating the uncertainties, valuable resources and efforts can be focused on identifying and fixing the leak path. In applications using radio frequency identification (RFID) technology, techniques of the present disclosure can be applied to downhole plugs. For example, the techniques can be used for long-term plug and suspension operations where failed barrier plugs may present a safety hazard in terms of breaking well barrier containment to rig up well control equipment. The techniques can also be applied in production packers for single or multi-lateral wells. Use of the techniques can resolve the persistent challenge of uncertainty surrounding inconclusive pressure test operations. This can address the challenge of confirming a leak across the service packer and can provide the capability of detecting a loss of pressure integrity below the service packer.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes techniques that can be used for a smart retrievable service packer for pressure testing operations, such as to identify when a leak exists across the service packer. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

A smart retrievable service packer can include a capability to detect (or confirm the nonexistence of) a pressure leak occurring across the service packer during well operations (general service, squeeze cementing, testing and treating, and cased-hole production testing). A primary objective of the smart retrievable service packer is to support drilling efforts in minimizing the operational time required to integrity test cased hole sections. This can directly improve operations efficiency and cost effectiveness.

In some implementations, the smart retrievable service packer can use any of three techniques by which a pressure leak across the packer is detected. A first technique can include the use of use of radio frequency identification (RFID) devices located above and below the packer element. A second technique can include the use of a force sensor which uses silicon piezo-resistive elements to detect the pressure applied to the sensing element by inference of the force. A third technique can include the use of a combination of RFID tags and at least one force sensor.

Detection Using RFID Technology

In this technique, an RFID tag, located below the deepest service packer element, has the capability to detect pressure changes. A second RFID tag can be located above the service packer. A purpose of the second RFID device is to communicate with surface systems. Communication can be used, for example, to transmit data measured by the RFID device located below the packer to the surface using pressure perturbation (or pulses). A receiver sensor (or station) can be located at the surface to receive and decode received pressure pulses. This configuration can provide a real-time confirmation of downhole service packer integrity. This configuration can also provide a real-time indication of problems that may exist with the service packer. For example, the term real-time can correspond to events, such as communications, that occur within a specified period of time, such as within a few seconds.

Figure 1:
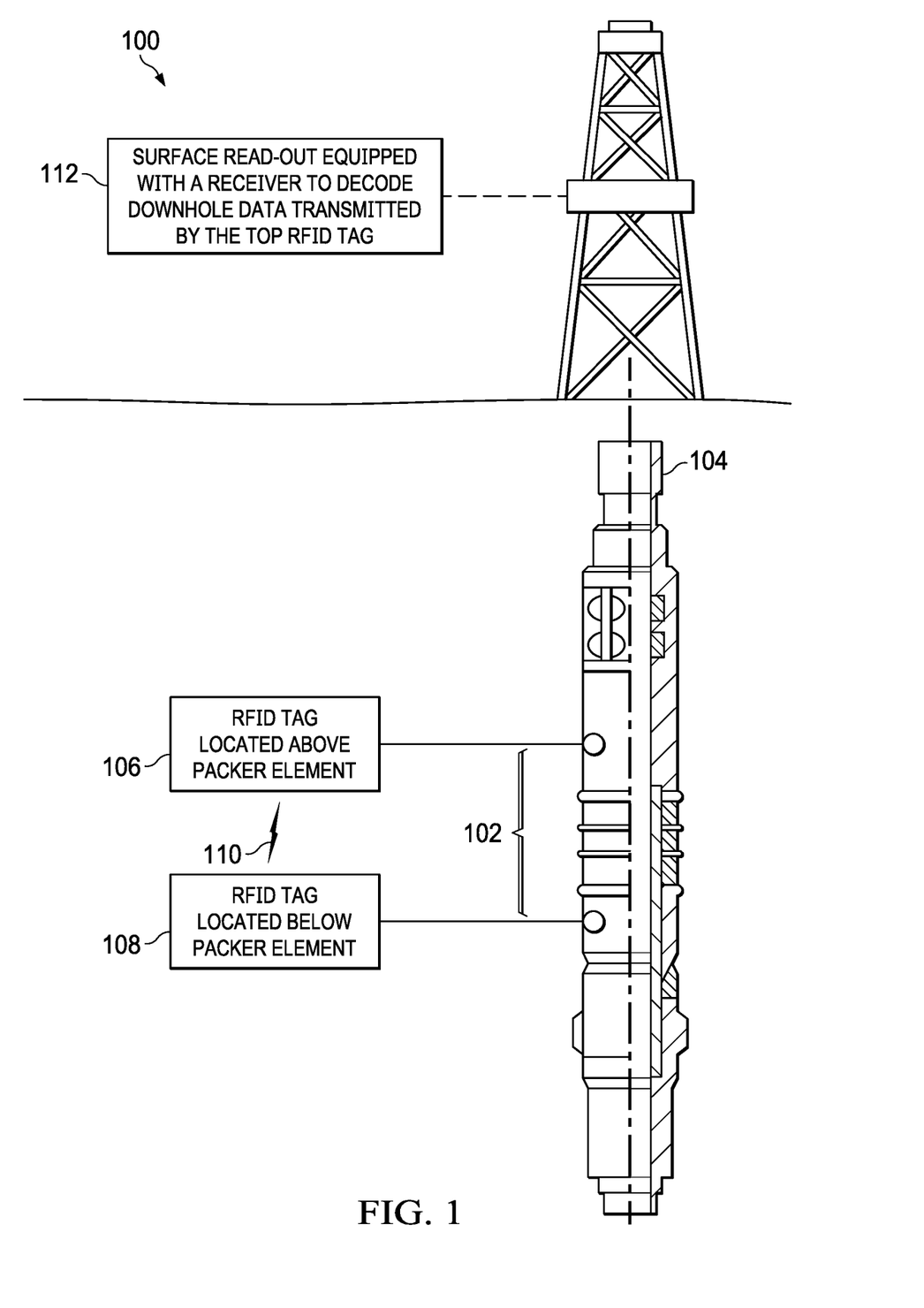
FIG. 1 is a block diagram of an example of radio frequency identification (RFID) tags being used above and below a packer element, according to some implementations of the present disclosure.

FIG. 1 is a block diagram of an example of RFID tags being used above and below a packer element, according to some implementations of the present disclosure. For example, a packer element 102 of a service packer 104 can be part of a drilling operation performed at a well 100. Atop RFID tag 106 can be positioned above (or upstring of) the packer element 102. A lower RFID tag 108 can be below (or downstring of) the packer element 102. Other RFID tags are possible. Communication 110 can occur between the top RFID tag 106 and the lower RFID tag 108, such as when the lower RFID tag 108 transmits information to the top RFID tag 106. The top RFID tag can transmit to the a surface read-out equipment 112, for example, equipped with a receiver to decode downhole data transmitted by the top FRID tag 106.

Detection Using a Force Sensor

In this technique, a sensing element can include a silicon diaphragm that is integrated with a circuit chip. The circuit chip can contain one or more implanted piezo-resistors which are connected to form a circuit bridge. The sensing element can be embedded into the sides of elements of the service packer, preferably below the deepest packer element. The sensing element can include a read-out point located below the service packer. The read-out point can also be connected using circuitry to implanted piezo-resistors. During a pressure test operation, for example, if the service packer elements fail to hold pressure, the silicon diaphragm will see the applied pressure. This will cause the resistance of the piezo-resistors to change proportionally to the sensed pressure, and that will in turn change the balance of the circuit bridge. The result may also be a proportional force which may cause shifting of the position of a "switch". This may be referred to the "pressure switch" in the application; and would be physically read and interpreted after the service packer is retrieved to surface Detection Using a Combination of RFID Technology and a Force Sensor In some implementations, a combination of RFID technology and at least one force sensor can be user. During run-in-hole (RIH) (or drilling) operations, a service packer is also installed, and pressure/test (P/T) operations occur.

In some implementations, a service packer can be determined to be leaking if the following occur. The lower RFID tag (below the service packer) detects pressure differential or change below the service packer. The lower RFID tag then sends a signal to the top RFID, for example, using a digital handshake. The top RFID tag transmits the information to surface read-out equipment that is equipped with a receiver. In some implementations, the information can be downloaded to a computer system for analysis when the packer is pulled out of the hole (POOH) to the surface. The information can be used as diagnostics to troubleshoot a failed or inconclusive P/T operation.

In some implementations, when a leak has been detected during a P/T operation, a similar set of actions can be used to infer and confirm that the leak is not due to the service packer. In this scenario, the lower RFID tag would have transmitted information that no pressure change/differential was detected during the P/T operation. In some implementations in which pressure detection using a force sensor is included, the information can be read and interpreted at the surface as an additional layer of confirmation.

Figure 2:
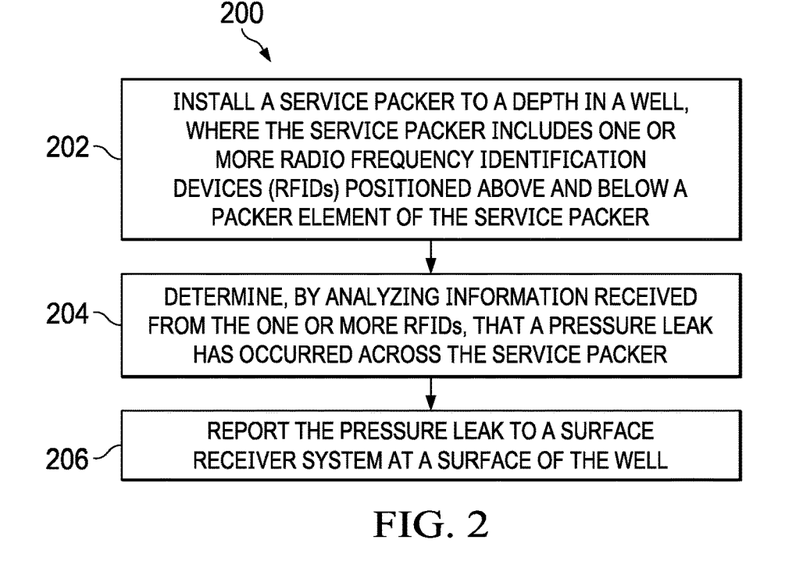
FIG. 2 is a flowchart showing an example of a method using RFIDs above and below a packer element to identify and report leaks to a surface receiver system, according to some implementations of the present disclosure.

FIG. 2 is a flowchart showing an example of a method 200 using RFIDs above and below a packer element to identify and report leaks to a surface receiver system, according to some implementations of the present disclosure. For clarity of presentation, the description that follows generally describes method 200 in the context of the other figures in this description. However, it will be understood that method 200 can be performed, for example, by any suitable system, environment, software, and hardware, or a combination of systems, environments, software, and hardware, as appropriate. In some implementations, various steps of method 200 can be run in parallel, in combination, in loops, or in any order.

At 202, a service packer is installed to a depth in a well. The service packer includes one or more radio frequency identification devices (RFIDs) positioned above and below a packer element of the service packer. For example, the service packer 104 can be installed in the well that is being monitored by the surface read-out equipment 112. The one or more RFIDs can include the top RFID tag 106 located uphole of the service packer and the lower RFID tag 108 downhole of the packer element 102, for example. From 202, method 200 proceeds to 204.

At 204, a determination is made, by analyzing information received from the one or more RFIDs, that a pressure leak has occurred across the service packer. For example, determining that the pressure leak has occurred across the service packer can include analyzing information received from one or more RFIDs 106 and 108 and force sensors. Three lower RFID tag 108 and the upper RFID tag 106 can be in communication with each other. From 204, method 200 proceeds to 206.

At 206, the pressure leak is reported to a surface receiver system at a surface of the well. In some implementations, reporting the pressure leak to the surface receiver system can include: generating, by the lower RFID for transmission by the upper RFID, pressure perturbation pulses; transmitting, by the upper RFID, the pressure perturbation pulses to the surface receiver system; and decoding the pressure perturbation pulses by a decoding system of the surface receiver system. The surface receiver system can be a pressure transducer installed on a stand-pipe T-piece, and the decoding system can be a computer such as a hand-held device. The transducer can transmit a series of binary signals (zeroes and ones) based on data received from the downhole RFIDs and a piezo-resistor force sensor. In the binary signals, a zero may indicate no leaks, and a one may indicate a leak. Processing of the data to confirm status of the packer downhole can be based on a receiving and decoding a consistent series of zeroes and ones for a defined period of time. For example, the period of time can be a pre-determined time in the range of 5-15 minutes, or a longer duration as desired to be monitored by the user.

In some implementations, reporting the pressure leak to the surface receiver system can include: retrieving the service packer at the surface; and reading, by the surface receiver system, a pressure switch on the service packer, the pressure switch indicating that a resistance change occurred in a resistance of piezo-resistors caused by a silicon diaphragm sensing a failure of pressure to hold, where the resistance change resulted in a change in a balance of a circuit bridge causing a position shift in a position switch of the service packer.

In some implementations, reporting the pressure leak to the surface receiver system can further include transmitting, by the upper RFID using pressure pulses transmitted to the surface receiver system, an indication of an occurrence of the position shift; and decoding, by the surface receiver system prior to the packer being retrieved to surface. After 206, method 200 can stop.

Figure 3:
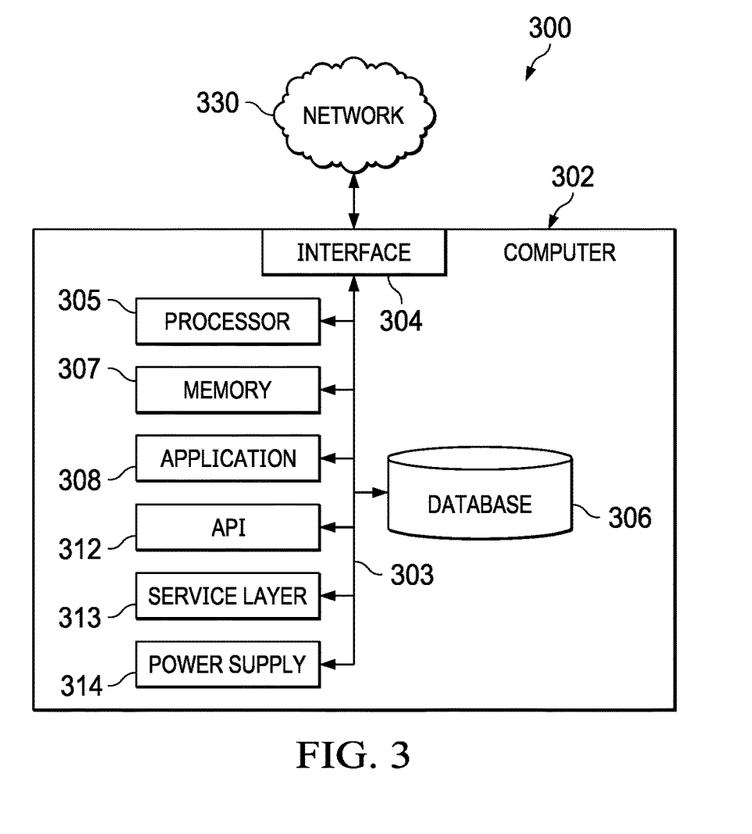
FIG. 3 is a block diagram illustrating an example computer system used to provide computational functionalities associated with described algorithms, methods, functions, processes, flows, and procedures as described in the present disclosure, according to some implementations of the present disclosure.

FIG. 3 is a block diagram of an example computer system 300 used to provide computational functionalities associated with described algorithms, methods, functions, processes, flows, and procedures described in the present disclosure, according to some implementations of the present disclosure. The illustrated computer 302 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 302 can include input devices such as keypads, keyboards, and touch screens that can accept user information. Also, the computer 302 can include output devices that can convey information associated with the operation of the computer 302. The information can include digital data, visual data, audio information, or a combination of information. The information can be presented in a graphical user interface (UI) (or GUI).

The computer 302 can serve in a role as a client, a network component, a server, a database, a persistency, or components of a computer system for performing the subject matter described in the present disclosure. The illustrated computer 302 is communicably coupled with a network 330. In some implementations, one or more components of the computer 302 can be configured to operate within different environments, including cloud-computing-based environments, local environments, global environments, and combinations of environments.

At a top level, the computer 302 is an electronic computing device operable to receive, transmit, process, store, and manage data and information associated with the described subject matter. According to some implementations, the computer 302 can also include, or be communicably coupled with, an application server, an email server, a web server, a caching server, a streaming data server, or a combination of servers.

The computer 302 can receive requests over network 330 from a client application (for example, executing on another computer 302). The computer 302 can respond to the received requests by processing the received requests using software applications. Requests can also be sent to the computer 302 from internal users (for example, from a command console), external (or third) parties, automated applications, entities, individuals, systems, and computers.

Each of the components of the computer 302 can communicate using a system bus 303. In some implementations, any or all of the components of the computer 302, including hardware or software components, can interface with each other or the interface 304 (or a combination of both) over the system bus 303. Interfaces can use an application programming interface (API) 312, a service layer 313, or a combination of the API 312 and service layer 313. The API 312 can include specifications for routines, data structures, and object classes. The API 312 can be either computer-language independent or dependent. The API 312 can refer to a complete interface, a single function, or a set of APIs.

The service layer 313 can provide software services to the computer 302 and other components (whether illustrated or not) that are communicably coupled to the computer 302. The functionality of the computer 302 can be accessible for all service consumers using this service layer. Software services, such as those provided by the service layer 313, can provide reusable, defined functionalities through a defined interface. For example, the interface can be software written in JAVA, C++, or a language providing data in extensible markup language (XML) format. While illustrated as an integrated component of the computer 302, in alternative implementations, the API 312 or the service layer 313 can be stand-alone components in relation to other components of the computer 302 and other components communicably coupled to the computer 302. Moreover, any or all parts of the API 312 or the service layer 313 can be implemented as child or sub-modules of another software module, enterprise application, or hardware module without departing from the scope of the present disclosure.

The computer 302 includes an interface 304. Although illustrated as a single interface 304 in FIG. 3, two or more interfaces 304 can be used according to particular needs, desires, or particular implementations of the computer 302 and the described functionality. The interface 304 can be used by the computer 302 for communicating with other systems that are connected to the network 330 (whether illustrated or not) in a distributed environment. Generally, the interface 304 can include, or be implemented using, logic encoded in software or hardware (or a combination of software and hardware) operable to communicate with the network 330. More specifically, the interface 304 can include software supporting one or more communication protocols associated with communications. As such, the network 330 or the interface's hardware can be operable to communicate physical signals within and outside of the illustrated computer 302.

The computer 302 includes a processor 305. Although illustrated as a single processor 305 in FIG. 3, two or more processors 305 can be used according to particular needs, desires, or particular implementations of the computer 302 and the described functionality. Generally, the processor 305 can execute instructions and can manipulate data to perform the operations of the computer 302, including operations using algorithms, methods, functions, processes, flows, and procedures as described in the present disclosure.

The computer 302 also includes a database 306 that can hold data for the computer 302 and other components connected to the network 330 (whether illustrated or not). For example, database 306 can be an in-memory, conventional, or a database storing data consistent with the present disclosure. In some implementations, database 306 can be a combination of two or more different database types (for example, hybrid in-memory and conventional databases) according to particular needs, desires, or particular implementations of the computer 302 and the described functionality. Although illustrated as a single database 306 in FIG. 3, two or more databases (of the same, different, or combination of types) can be used according to particular needs, desires, or particular implementations of the computer 302 and the described functionality. While database 306 is illustrated as an internal component of the computer 302, in alternative implementations, database 306 can be external to the computer 302.

The computer 302 also includes a memory 307 that can hold data for the computer 302 or a combination of components connected to the network 330 (whether illustrated or not). Memory 307 can store any data consistent with the present disclosure. In some implementations, memory 307 can be a combination of two or more different types of memory (for example, a combination of semiconductor and magnetic storage) according to particular needs, desires, or particular implementations of the computer 302 and the described functionality. Although illustrated as a single memory 307 in FIG. 3, two or more memories 307 (of the same, different, or combination of types) can be used according to particular needs, desires, or particular implementations of the computer 302 and the described functionality. While memory 307 is illustrated as an internal component of the computer 302, in alternative implementations, memory 307 can be external to the computer 302.

The application 308 can be an algorithmic software engine providing functionality according to particular needs, desires, or particular implementations of the computer 302 and the described functionality. For example, application 308 can serve as one or more components, modules, or applications. Further, although illustrated as a single application 308, the application 308 can be implemented as multiple applications 308 on the computer 302. In addition, although illustrated as internal to the computer 302, in alternative implementations, the application 308 can be external to the computer 302.

The computer 302 can also include a power supply 314. The power supply 314 can include a rechargeable or non-rechargeable battery that can be configured to be either user- or non-user-replaceable. In some implementations, the power supply 314 can include power-conversion and management circuits, including recharging, standby, and power management functionalities. In some implementations, the power-supply 314 can include a power plug to allow the computer 302 to be plugged into a wall socket or a power source to, for example, power the computer 302 or recharge a rechargeable battery.

There can be any number of computers 302 associated with, or external to, a computer system containing computer 302, with each computer 302 communicating over network 330. Further, the terms "client," "user," and other appropriate terminology can be used interchangeably, as appropriate, without departing from the scope of the present disclosure. Moreover, the present disclosure contemplates that many users can use one computer 302 and one user can use multiple computers 302.

Described implementations of the subject matter can include one or more features, alone or in combination.

For example, in a first implementation, a computer-implemented method includes the following. A service packer is installed to a depth in a well. The service packer includes one or more radio frequency identification devices (RFIDs) positioned above and below a packer element of the service packer. A determination is made, by analyzing information received from the one or more RFIDs, that a pressure leak has occurred across the service packer. The pressure leak is reported to a surface receiver system at a surface of the well.

The foregoing and other described implementations can each, optionally, include one or more of the following features:

A first feature, combinable with any of the following features, where the one or more RFIDs include a lower RFID located downhole of the service packer and an upper RFID located uphole of the service packer, and where the lower RFID and the upper RFID are in communication with each other.

A second feature, combinable with any of the previous or following features, where reporting the pressure leak to the surface receiver system includes: generating, by the lower RFID for transmission by the upper RFID, pressure perturbation pulses; transmitting, by the upper RFID, the pressure perturbation pulses to the surface receiver system; and decoding the pressure perturbation pulses by a decoding system of the surface receiver system.

A third feature, combinable with any of the previous or following features, where the surface receiver system is a pressure transducer installed on a stand-pipe T-piece and where the decoding system is a hand held device.

A fourth feature, combinable with any of the previous or following features, where reporting the pressure leak to the surface receiver system includes: retrieving the service packer at the surface; and reading, by the surface receiver system, a pressure switch on the service packer, the pressure switch indicating that a resistance change occurred in a resistance of piezo-resistors caused by a silicon diaphragm sensing a failure of pressure to hold, where the resistance change resulted in a change in a balance of a circuit bridge causing a position shift in a position switch of the service packer.

A fifth feature, combinable with any of the previous or following features, where reporting the pressure leak to the surface receiver system further includes: transmitting, by the upper RFID using pressure pulses transmitted to the surface receiver system, an indication of an occurrence of the position shift; and decoding, by the surface receiver system prior to the service packer being retrieved to surface.

A sixth feature, combinable with any of the previous or following features, where determining that a pressure leak has occurred across the service packer includes receiving and decoding a consistent series of zeroes and ones from the one or more RFIDs for a defined period of time.

In a second implementation, a non-transitory, computer-readable medium stores one or more instructions executable by a computer system to perform operations including the following. A service packer is installed to a depth in a well. The service packer includes one or more radio frequency identification devices (RFIDs) positioned above and below a packer element of the service packer. A determination is made, by analyzing information received from the one or more RFIDs, that a pressure leak has occurred across the service packer. The pressure leak is reported to a surface receiver system at a surface of the well.

The foregoing and other described implementations can each, optionally, include one or more of the following features:

A first feature, combinable with any of the following features, where the one or more RFIDs include a lower RFID located downhole of the service packer and an upper RFID located uphole of the service packer, and where the lower RFID and the upper RFID are in communication with each other.

A second feature, combinable with any of the previous or following features, where reporting the pressure leak to the surface receiver system includes: generating, by the lower RFID for transmission by the upper RFID, pressure perturbation pulses; transmitting, by the upper RFID, the pressure perturbation pulses to the surface receiver system; and decoding the pressure perturbation pulses by a decoding system of the surface receiver system.

A third feature, combinable with any of the previous or following features, where the surface receiver system is a pressure transducer installed on a stand-pipe T-piece and where the decoding system is a hand held device.

A fourth feature, combinable with any of the previous or following features, where reporting the pressure leak to the surface receiver system includes: retrieving the service packer at the surface; and reading, by the surface receiver system, a pressure switch on the service packer, the pressure switch indicating that a resistance change occurred in a resistance of piezo-resistors caused by a silicon diaphragm sensing a failure of pressure to hold, where the resistance change resulted in a change in a balance of a circuit bridge causing a position shift in a position switch of the service packer.

A fifth feature, combinable with any of the previous or following features, where reporting the pressure leak to the surface receiver system further includes: transmitting, by the upper RFID using pressure pulses transmitted to the surface receiver system, an indication of an occurrence of the position shift; and decoding, by the surface receiver system prior to the service packer being retrieved to surface.

A sixth feature, combinable with any of the previous or following features, where determining that a pressure leak has occurred across the service packer includes receiving and decoding a consistent series of zeroes and ones from the one or more RFIDs for a defined period of time.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following.

The foregoing and other described implementations can each, optionally, include one or more of the following features:

A first feature, combinable with any of the following features, where the one or more RFIDs include a lower RFID located downhole of the service packer and an upper RFID located uphole of the service packer, and where the lower RFID and the upper RFID are in communication with each other.

A second feature, combinable with any of the previous or following features, where reporting the pressure leak to the surface receiver system includes: generating, by the lower RFID for transmission by the upper RFID, pressure perturbation pulses; transmitting, by the upper RFID, the pressure perturbation pulses to the surface receiver system; and decoding the pressure perturbation pulses by a decoding system of the surface receiver system.

A third feature, combinable with any of the previous or following features, where the surface receiver system is a pressure transducer installed on a stand-pipe T-piece and where the decoding system is a hand held device.

A fourth feature, combinable with any of the previous or following features, where reporting the pressure leak to the surface receiver system includes: retrieving the service packer at the surface; and reading, by the surface receiver system, a pressure switch on the service packer, the pressure switch indicating that a resistance change occurred in a resistance of piezo-resistors caused by a silicon diaphragm sensing a failure of pressure to hold, where the resistance change resulted in a change in a balance of a circuit bridge causing a position shift in a position switch of the service packer.

A fifth feature, combinable with any of the previous or following features, where reporting the pressure leak to the surface receiver system further includes: transmitting, by the upper RFID using pressure pulses transmitted to the surface receiver system, an indication of an occurrence of the position shift; and decoding, by the surface receiver system prior to the service packer being retrieved to surface.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
   installing a service packer to a depth in a well, wherein the service packer includes one or more radio frequency identification devices (RFIDs) positioned above and below a packer element of the service packer;
   determining, by analyzing information received from the one or more RFIDs, that a pressure leak has occurred across the service packer; and
   reporting the pressure leak to a surface receiver system at a surface of the well, wherein reporting the pressure leak to the surface receiver system includes:
      retrieving the service packer at the surface; and
      reading, by the surface receiver system, a pressure switch on the service packer, the pressure switch indicating that a resistance change occurred in a resistance of piezo-resistors caused by a silicon diaphragm sensing a failure of pressure to hold, wherein the resistance change resulted in a change in a balance of a circuit bridge causing a position shift in a position switch of the service packer.

2. The computer-implemented method of claim 1, wherein the one or more RFIDs include a lower RFID located downhole of the service packer and an upper RFID located uphole of the service packer, and wherein the lower RFID and the upper RFID are in communication with each other.

3. The computer-implemented method of claim 2, wherein reporting the pressure leak to the surface receiver system includes:
   generating, by the lower RFID for transmission by the upper RFID, pressure perturbation pulses;
   transmitting, by the upper RFID, the pressure perturbation pulses to the surface receiver system; and
   decoding the pressure perturbation pulses by a decoding system of the surface receiver system.

4. The computer-implemented method of claim 3, wherein the surface receiver system is a pressure transducer installed on a stand-pipe T-piece and wherein the decoding system is a hand held device.

5. The computer-implemented method of claim 1, wherein reporting the pressure leak to the surface receiver system further includes:
   transmitting, by the upper RFID using pressure pulses transmitted to the surface receiver system, an indication of an occurrence of the position shift; and
   decoding, by the surface receiver system prior to the service packer being retrieved to surface.

6. The computer-implemented method of claim 1, wherein determining that a pressure leak has occurred across the service packer includes receiving and decoding a consistent series of zeroes and ones from the one or more RFIDs for a defined period of time.

7. A non-transitory, computer-readable medium storing one or more instructions executable by a computer system to perform operations comprising:
   installing a service packer to a depth in a well, wherein the service packer includes one or more radio frequency identification devices (RFIDs) positioned above and below a packer element of the service packer;
   determining, by analyzing information received from the one or more RFIDs, that a pressure leak has occurred across the service packer; and reporting the pressure leak to a surface receiver system at a surface of the well, wherein reporting the pressure leak to the surface receiver system includes:
retrieving the service packer at the surface; and
reading, by the surface receiver system, a pressure switch on the service packer, the pressure switch indicating that a resistance change occurred in a resistance of piezo-resistors caused by a silicon diaphragm sensing a failure of pressure to hold, wherein the resistance change resulted in a change in a balance of a circuit bridge causing a position shift in a position switch of the service packer.

8. The non-transitory, computer-readable medium of claim 7, wherein the one or more RFIDs include a lower RFID located downhole of the service packer and an upper RFID located uphole of the service packer, and wherein the lower RFID and the upper RFID are in communication with each other.

9. The non-transitory, computer-readable medium of claim 8, wherein reporting the pressure leak to the surface receiver system includes:
generating, by the lower RFID for transmission by the upper RFID, pressure perturbation pulses;
transmitting, by the upper RFID, the pressure perturbation pulses to the surface receiver system; and
decoding the pressure perturbation pulses by a decoding system of the surface receiver system.

10. The non-transitory, computer-readable medium of claim 9, wherein the surface receiver system is a pressure transducer installed on a stand-pipe T-piece and wherein the decoding system is a hand held device.

11. The non-transitory, computer-readable medium of claim 7, wherein reporting the pressure leak to the surface receiver system further includes:
transmitting, by the upper RFID using pressure pulses transmitted to the surface receiver system, an indication of an occurrence of the position shift; and
decoding, by the surface receiver system prior to the service packer being retrieved to surface.

12. The non-transitory, computer-readable medium of claim 7, wherein determining that a pressure leak has occurred across the service packer includes receiving and decoding a consistent series of zeroes and ones from the one or more RFIDs for a defined period of time.

13. A computer-implemented system, comprising:
one or more processors; and
a non-transitory computer-readable storage medium coupled to the one or more processors and storing programming instructions for execution by the one or more processors, the programming instructions instructing the one or more processors to perform operations comprising:
installing a service packer to a depth in a well, wherein the service packer includes one or more radio frequency identification devices (RFIDs) positioned above and below a packer element of the service packer;
determining, by analyzing information received from the one or more RFIDs, that a pressure leak has occurred across the service packer; and
reporting the pressure leak to a surface receiver system at a surface of the well, wherein reporting the pressure leak to the surface receiver system includes:
retrieving the service packer at the surface; and
reading, by the surface receiver system, a pressure switch on the service packer, the pressure switch indicating that a resistance change occurred in a resistance of piezo-resistors caused by a silicon diaphragm sensing a failure of pressure to hold, wherein the resistance change resulted in a change in a balance of a circuit bridge causing a position shift in a position switch of the service packer.

14. The computer-implemented system of claim 13, wherein the one or more RFIDs include a lower RFID located downhole of the service packer and an upper RFID located uphole of the service packer, and wherein the lower RFID and the upper RFID are in communication with each other.

15. The computer-implemented system of claim 14, wherein reporting the pressure leak to the surface receiver system includes:
generating, by the lower RFID for transmission by the upper RFID, pressure perturbation pulses;
transmitting, by the upper RFID, the pressure perturbation pulses to the surface receiver system; and
decoding the pressure perturbation pulses by a decoding system of the surface receiver system.

16. The computer-implemented system of claim 15, wherein the surface receiver system is a pressure transducer installed on a stand-pipe T-piece and wherein the decoding system is a hand held device.

17. The computer-implemented system of claim 13, wherein reporting the pressure leak to the surface receiver system further includes:
transmitting, by the upper RFID using pressure pulses transmitted to the surface receiver system, an indication of an occurrence of the position shift; and
decoding, by the surface receiver system prior to the service packer being retrieved to surface.

* * * * *